United States Patent Office 3,743,476
Patented July 3, 1973

3,743,476
CONTINUOUS DYEING OF SYNTHETIC FIBERS WITH WATER-IMMISCIBLE ORGANIC SOLVENTS AND AMINO HYDROXY ANTHRAQUINONES
Günter Gehrke, Volker Hederich, and Peter Wegner, Cologne, and Rütger Neeff, Leverkusen, Germany, assignors to Bayer Aktiengesellschaft, Leverkusen, Germany
No Drawing. Filed Aug. 10, 1970, Ser. No. 62,652
Claims priority, application Germany, Aug. 16, 1969, P 19 41 699.0
Int. Cl. C09b 1/50; D06p 1/20
U.S. Cl. 8—39      13 Claims

ABSTRACT OF THE DISCLOSURE

Process for the continuous dyeing of synthetic fibre materials from organic solvents, characterised in that the fibre materials are impregnated with dyeing liquors which contain anthraquinone dyestuffs of formula

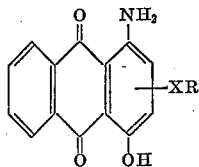

in which X denotes oxygen or sulphur and R represents a $C_4$–$C_{18}$-alkyl radical or an alkoxyalkyl, cycloalkoxyalkyl, aralkoxyalkyl or aryloxyalkyl radical, and that the materials are subsequently subjected to a heat treatment.

The dyeings obtained are distinguished by high dyestuff yield, very good build-up and excellent fastness properties, especially very good fastness to thermofixing, washing, rubbing and light.

---

The invention relates to a process for the continuous dyeing of synthetic fibre materials from organic solvents; the process is characterised in that the fibre materials are impregnated with dyeing liquors, which contain anthraquinone dyestuffs of formula

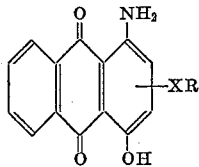

in which

X denotes oxygen or sulphur and
R represents a $C_4$–$C_{18}$-alkyl, preferably $C_6$–$C_{16}$-alkyl, or an alkoxyalkyl, cycloalkoxyalkyl, aralkoxyalkyl or aryloxyalkyl radical, and that the materials are subsequently subjected to a heat treatment.

For R, possible $C_4$–$C_{18}$-alkyl radicals are for example: the n-butyl, iso-butyl, sec.-butyl, tert.-butyl, n-pentyl, iso-amyl, sec.-pentyl, neopentyl, methylpentyl, dimethyl-butyl, n-hexyl, methyl-hexyl, dimethyl-pentyl, trimethyl-butyl, n-octyl, iso-octyl, methyl-heptyl, dimethyl-hexyl, trimethyl-pentyl, tetramethyl-butyl, iso-nonyl, dimethyl-heptyl, tri-methyl-hexyl radical, n-decyl, dimethyl-octyl, n-dodecyl, dimethyl-decyl, n-tetradecyl, n-hexadecyl and the n-octa-decyl radical.

For R, the following may be mentioned as examples of alkoxyalkyl radicals: the iso-propoxy-ethyl, ethylhexoxy-ethyl, ethoxy-propyl, tert.-butoxy-propyl, ethoxy-iso-propyl, iso-pentyloxy-propyl, methoxy-butyl, ethoxy-butyl, methoxy-iso-butyl, ethoxy-iso-butyl and the ethoxy-hexyl radical; also the (2-butoxy-ethoxy)-ethyl and the [2-(ethylhexoxy)-ethoxy]-ethyl radical.

As cycloalkoxyalkyl radicals, the cyclohexoxy-ethyl, cyclohexoxy-propyl, methyl - cyclohexoxy - ethyl and methyl-cyclohexoxy-propyl radical.

As aralkoxyalkyl radicals, the benzyloxy-ethyl, benzyl-oxy-propyl, methyl-benzyloxy-ethyl, methoxy-benzyloxy-ethyl and benzyloxy-butyl radical.

As aryloxyalkyl radicals, the 3-methyl-2-iso-propyl-phenoxy-ethyl, iso - propyl - phenoxy-propyl, cyclohexyl-phenoxy-propyl, α,α-dimethyl-benzyl-phenoxy-propyl, p-tert.-butyl-phenoxy - iso - propyl, cyclohexyl-phenoxy-iso-propyl, phenoxy-iso-butyl, benzyl-phenoxy-iso-butyl, iso-propyl-phenoxy-iso-butyl and methyl - phenoxy - butyl radical.

Preferred anthraquinone dyestuffs of Formula I are those in which R represents an alkoxyalkyl, cycloalkoxyalkyl, aralkoxyalkyl or aryloxyalkyl radical described by one of the three Formulae A, B and C;

(A) $\qquad -(CH_2-CH_2-O)_nR_1$ in which n is 1 or 2 and
$R_1$ represents a $C_2$–$C_{18}$-alkyl, cycloalkyl, aralkyl radical or a phenyl radical which is optionally substituted by $C_1$–$C_9$-alkyl, cycloalkyl, aralkyl, $C_1$–$C_5$-alkoxy, $C_1$–$C_5$-alkylmercapto or $C_1$–$C_5$-alkoxycarbonyl groups and/or chlorine atoms, with the proviso that the sum of the carbon atoms contained in $R_1$ is at least 2 and at most 18.

(B) 
$$-\underset{\underset{R_2}{|}}{C}H-CH_2-OR_1$$

in which $R_2$ represents a methyl or ethyl group, and
$R_1$ has the significance given under Formula A, with the proviso that the sum of the carbon atoms contained in $R_1$ is at least 2 and at most 18.

(C) 
$$-C\underset{}{H}\diagup\overset{CH_2-OR_3}{\diagdown}_{CH_2-OR_4}$$

in which $R_3$ and $R_4$ independently of one another represent a $C_2$–$C_{18}$-alkyl, cycloalkyl or aralkyl radical or a phenyl radical which is optionally substituted by $C_1$–$C_9$-alkyl, cycloalkyl, aralkyl, $C_1$–$C_5$-alkoxy, $C_1$–$C_5$-alkylmercapto or $C_1$–$C_5$-alkoxycarbonyl groups and/or chlorine atoms, with the proviso that the sum of the carbon atoms contained in total in $R_3$ and $R_4$ is at least 4 and at most 36.

For $R_1$, the following may be mentioned as examples of $C_2$–$C_{18}$-, preferably $C_3$–$C_{10}$-alkyl radicals: n-propyl, iso-propyl, n-butyl, tert.-butyl, 2-ethyl-hexyl and the dodecyl radical.

As cycloalkyl radicals, the cyclohexyl and the methyl-cyclohexyl radical may be mentioned, and as aralkyl radicals, the benzyl radical and especially the α,α-dimethyl-benzyl radical may be mentioned.

Possible optionally substituted phenyl radicals are for example: the 4-methyl-, 2,4-dimethyl-, 4-ethyl-, 3-methyl-, 2-iso-propyl-, tert.-butyl-, iso-nonyl-, the cyclo-hexyl-, benzyl-, α-methylbenzyl-, methoxy-, ethoxy-, methylmercapto- and butoxy-carbonyl-phenyl radical.

The dyestuffs used according to the invention for the dyeing from organic solvents are obtained according to processes which are in themselves known, for example by reaction of 1-amino-4-hydroxy-anthraquinones, which in the 2- or 3-position carry a replaceable substituent such as chlorine or bromine, lower alkoxy or phenoxy radicals or sulphonic acid groups, with hydroxy- or mercapto-alkyl compounds which can be substituted by alkoxy or aryloxy groups, in the presence of inorganic or organic bases, optionally using inert solvents such as N-methyl-pyrrolidone or dimethylformamide, or, for example, by reaction of appropriate 2- or 3-hydroxy- or mercapto-anthraquinones with, for example, aryl-sulphonyl-oxyalkyl compounds.

Possible organic solvents for the process according to the invention are those solvents which are immiscible with water and of which the boiling points lie between 40 and 150° C., for example aromatic hydrocarbons, such as toluene or xylene, and aliphatic halogenated hydrocarbons, especially chloro-hydrocarbons, such as methylene chloride, chloroform, carbon tetrachloride, 1,1-dichlorethane, 1,2-dichlorethane, 1,1,2-trichlorethane, 1,1,1,2-tetrachlorethane, 1,1,2,2 - tetrachlorethane, pentachlorethane, 1-chloropropane, 2-chloropropane, 1,2-dichloropropane, 1,1,1-trichloropropane, 1-chlorobutane, 2-chlorobutane, 1,4-dichlorobutane, 1-chloro-2-methyl-propane or 2-chloro-2-methylpropane, as well as aliphatic fluoro- or fluoro-chloro-hydrocarbons, such as perfluoro-n-hexane, 1,2,2-trifluoro-trichlorethane and 1,1,1-trifluoro-pentachloropropane, and aromatic chloro- and fluoro-hydrocarbons, such as chlorobenzene, fluorobenzene, chlorotoluene and benzotrifluoride.

Tetrachlorethylene, trichlorethylene and 1,1,1-trichlorethane have proved particularly suitable. Mixtures of these solvents can also be used.

The synthetic fibre materials to be dyed according to the process of the invention are especially fibre materials of polyesters, for example polyethylene terephthalates or polyesters from 1,4-bis-(hydroxymethyl)-cyclohexane and terephthalic acid, of cellulose triacetate, of synthetic polyamides, such as poly-ε-caprolactam, polyhexamethylenediamine adipate or poly-ω-aminoundecane-acid, of polyurethanes or of polyolefins. The fibre materials can be in the form of woven fabrics and knitted fabrics.

For the dyeing, the dyestuffs to be used according to the invention are dissolved in the water-immiscible organic solvents or added to these in the form of solutions in solvents which are infinitely miscible with these solvents, such as alcohols, dimethylformamide, dimethylacetamide, dimethylsulphoxide or sulpholane, and the synthetic fibre materials are impregnated with the resulting clear dyestuff solutions, which can optionally additionally contain soluble non-ionic auxiliary agents, for example the known surface-active oxethylation and propoxylation products of fatty alcohols, alkylphenols, fatty acid amides and fatty acids, for improving the uniformity of the dyeings. Thereafetr the dyestuffs are fixed on the fibre materials by a heat treatment. The heat treatment can consist of a brief dry heat treatment at 120-230° C., with the dry heat treatment optionally being preceded by an intermediate drying, or of a treatment of the fibre materials in superheated solvent vapour at 100-150° C. Small amounts of non-fixed dyestuff can be eluted by brief treatment with the cold organic solvent. It should be pointed out that mixtures of the dyestuffs to be used according to the invention at times give a better colour yield than the individual dyestuffs and may sometimes show better solubility in the organic solvent.

Using the process according to the invention it is possible, when dyeing from organic solvents, to achieve dyeings on synthetic fibre materials which are distinguished by high dyestuff yield, very good build-up and excellent fastness properties, especially very good fastness to thermofixing, washing, rubbing and light. A further advantage of the dyestuffs to be used according to the invention is their high solubility in organic solvents, especially in tetrachlorethylene, trichlorethylene, 1,1,1-trichlorethane and 1,1,1-trichloropropane, which make it possible to carry out the dyeing even without the use of solubilising agents.

The parts indicated in the examples which follow are parts by weight.

EXAMPLE 1

A woven fabric of polyethylene terephthalate fibres is impregnated at room temperature with a clear red solution which contains 10 parts of 1-amino-2-(n-hexadecanoxy)-4-hydroxy-anthraquinone in 990 parts of tetrachlorethylene. After squeezing out to a weight increase of 60%, the woven fabric is dried for one minute at 80° C.

Thereafter the dyestuff is fixed by heating the woven fabric to 190-220° C. for 45 seconds. Thereafter the small amount of non-fixed dyestuff is eluted by brief treatment in cold tetrachlorethylene for 20 seconds. After drying, a clear red dyeing is obtained which is distinguished by its high dyestuff yield, very good build-up as well as good fastness properties, especially good fastness to thermofixing, washing, rubbing and light.

Equivalent red dyeings were also obtained analogously on woven fabrics of (a) cellulose triacetate, (b) synthetic polyamides or polyurethanes and (c) polypropylene fibres, except that the thermosol treatment was carried out at 200-220° C. for (a), at 170-200° C. for (b) and at 120-150° C. for (c).

Equivalent dyeings were also obtained if the 990 parts of tetrachlorethylene were replaced by the same amount of one of the following solvents: methylene chloride, chloroform, carbon tetrachloride, dichlorethane, trichlorethane, trichlorethylene, tetrachlorethane, dichloropropane, 1,1,1-trichloropropane, chlorobutane, dichlorobutane, perfluoro-n-hexane, 1,2,2-trifluorotrichlorethane and 1,1,1-trifluoropentachloropropane.

The dyestuff used had been manufactured as follows: 5 parts of 1-amino-2,4-dihydroxy-anthraquinone were warmed for one hour to 200° C. together with 2.5 parts of anhydrous sodium carbonate and 6 parts of n-hexadecanol-p-tosyl ester in 50 parts of anhydrous nitrobenzene. The reaction mixture, cooled to 80° C., was mixed with 80 parts of methanol and 5 parts of glacial acetic acid and after standing for several hours the product was filtered off in the cold. After washing with methanol and water, 8.2 parts of the abovementioned dyestuff were obtained, melting point after recrystallisation from pyridine: 101-102° C.

EXAMPLE 2

A knitted fabric of polyhexamethylenediamine adipate filaments is impregnated at room temperature with a clear red solution which contains 10 parts of 1-amino-2-decanoxy-4-hydroxyanthraquinone and 7 parts of nonylphenol-heptaglycol-ether in 983 parts of tetrachlorethylene. After squeezing out to a weight increase of 60%, the knitted fabric is dried for one minute at 80° C. Thereafter the dyestuff is fixed by heating the knitted fabric to 192° C. for 45 seconds. Small amounts of non-fixed dyestuff are then eluted by brief treatment in cold tetrachlorethylene. After drying, a clear red dyeing is obtained, which is distinguished by its high dyestuff yield, very good build-up and very good fastness properties, especially very good fastness to thermofixing, washing, rubbing and light.

An equivalent clear red dyeing was obtained analogously on woven fabrics of anionically modified polyhexamethylenediamine adipate. An equivalent dyeing was also obtained if instead of the 983 parts of tetrachlorethylene the same amount of toluene, xylene, chlorobenzene, dichlorobenzene or 1,2,2-trifluoro-trichloethane was used.

The dyestuff used had been manufactured as follows: 80 parts of decanol and 25 parts of dimethylformamide together with 9 parts of powdered potassium hydroxide were warmed to 150° C. After the introduction of 20 parts of 1-amino-2-phenoxy-4-hydroxy-anthraquinone the reaction mixture was stirred at 150° C. until the starting material had completely reacted and was then cooled and mixed with 50 parts of methanol. The dyestuff which separated out was filtered off and washed with methanol and water. Yield: 18.5 parts.

EXAMPLE 3

A woven fabric of polypropylene fibres is impregnated at room temperature with a clear red solution which contains 10 parts of 1-amino-2-(1-methyl-2-[p-cyclohexyl-phenoxy]-ethoxy)-4-hydroxy-anthraquinone and 7 parts of nonylphenol-heptaglycolether in 983 parts of tetrachlorethylene. After squeezing out to a weight increase of 60%, the woven fabric is dried for one minute at 80° C. Thereafter the dyestuff is fixed by heating the woven fabric to 140° C. for 30 seconds. Non-fixed amounts of dyestuff are eluted by brief treatment in cold solvent. A clear red dyeing is obtained, which is distinguished by high dyestuff yield, very good build-up and excellent fastness properties, especially very good fastness to thermofixing, washing, rubbing and light.

The dyestuff used had been manufactured as follows: 80 parts of 1-(p-cyclohexyl-phenoxy)-propanol-2, 2 parts of powdered potassium hydroxide and 10 parts of 1-amino-2-phenoxy-4-hydroxy-anthraquinone together with 30 parts of N-methylpyrrolidone were heated to 130–140° C. for 8 hours. After the addition of 100 parts of methanol, 10 parts of water and 2 parts of glacial acetic acid to the cooled reaction mixture, the dyestuff which separated out was filtered off and washed with methanol and water. Yield: 11.3 parts, melting point after recrystallisation from pyridine: 204–205° C.

EXAMPLE 4

A woven fabric of poly-1,4-cyclohexanedimethylene terephthalate is impregnated at room temperature with a clear red solution which contains 10 parts of 1-amino-2-[2-(2'-butoxyethoxy)-ethoxy]-4-hydroxy - anthraquinone and 7 parts of nonylphenol-heptaglycol-ether in 983 parts of tetrachloroethylene. After squeezing out to a weight increase of 60%, the woven fabric is dried for one minute at 80° C. Thereafter the dyestuff is fixed by heating the woven fabric to 190–220° C. for 45 seconds. The small amount of non-fixed dyestuff is then eluted by brief treatment in cold tetrachlorethylene. After drying, a clear red dyeing is obtained, which is distinguished by its high dyestuff yield, very good build-up and excellent fastness properties, especially very good fastness to thermofixing, washing, rubbing and light.

A clear red dyeing was obtained analogously on a woven fabric of anionically modified polyethylene terephthalate filaments.

The dyestuff used had been manufactured as follows: 15 parts of 1-amino-2-phenoxy - 4 - hydroxy - anthraquinone were introduced at 130° C. into a mixture of 60 parts of diethylene glycol monobutyl ether and 2 parts of powdered potassium hydroxide. The reaction is complete after 4 hours. The resulting dyestuff was separated out of the reaction mixture by adding 80 parts of water. After filtering and washing with methanol and water, 16.2 parts of dyestuff were obtained. Melting point after recrystallisation from pyridine: 92° C.

EXAMPLE 5

A woven fabric of polyethylene terephthalate fibres is impregnated at room temperature with a clear red solution which contains 10 parts of 1-amino-2-[2-(1,3-bis-p-tert.-butylphenoxy)-isopropoxy]-4-hydroxy-anthraquinone and 7 parts of nonylphenol-heptaglycol-ether in 982 parts of tetrachlorethylene. After squeezing out to a weight increase of 60%, the woven fabric is dried for one minute at 80° C. Thereafter the dyestuff is fixed by heating the woven fabric to 190–220° C. for 45 seconds. The small amount of non-fixed dyestuff is then eluted by brief rinsing with cold tetrachlorethylene. After drying, a clear red dyeing is obtained, which is distinguished by its high dyestuff yield, very good build-up and excellent fastness properties, especially very good fastness to thermofixing, washing, rubbing and light.

The dyestuff used had been manufactured as follows: 50 parts of α,α'-glycerine-di-(p-tert.-butyl)-phenyl-ether, 15 parts of N-methylpyrrolidone, 2 parts of potassium hydroxide and 10 parts of 1-amino-2-methoxy-4-hydroxy-anthraquinone were heated to 130° C. for 5 hours. After adding 100 parts of methanol and 2 parts of glacial acetic acid to the cooled reaction mixture, the dyestuff which separated out was filtered off and washed with methanol and water. Yield: 14.3 parts, melting point after recrystallisation from pyridine: 132–133° C.

EXAMPLE 6

A woven fabric of polyethylene terephthalate fibres is impregnated at room temperature with a clear red solution which contains 10 parts of 1-amino-2-[γ-benzyloxy-propoxy]-4-hydroxy-anthraquinone in 990 parts of 1,1,1-trichlorethane. After squeezing out to a weight increase of 60%, the dyestuff is fixed by treating the woven fabric with superheated 1,1,1-trichlorethane vapour at 140° C. for 45 seconds. Thereafter the small amount of non-fixed dyestuff is eluted by brief rinsing in cold 1,1,1-trichloethane. After drying, a clear red dyeing is obtained, which is distinguished by its high dyestuff yield, very good build-up and good fastness properties.

The dyestuff used had been manufactured as follows: 60 parts of propanediol - 1-,3-monobenzl-ether together with 2 parts of powdered potassium hydroxide and 10 parts of 1-amino-2-phenoxy - 4 - hydroxy - anthraquinone were warmed to 130–140° C. until the starting material had completely reacted. After the usual working up, 9.8 parts of dyestuff were obtained, melting point after recrystallisation from pyridine: 140–141° C.

EXAMPLE 7

A woven fabric of poly-1,4-cyclohexanedimethylene terephthalate is impregated at room temperature with a clear red solution which contains 10 parts of 1-amino-2-(2-[2' - isopropyl-3'-methyl-phenoxy]-ethoxy)-4-hydroxy-anthraquinone in 990 parts of tetrachlorethylene. After squeezing out to a weight increase of 60%, the dyestuff is fixed by treating the woven fabric with superheated tetrachlorethylene vapour at 150° C. for 35 seconds. Thereafter the small amount of non-fixed dyestuff is eluted by brief rinsing in cold tetrachlorethylene. After drying, a clear red dyeing is obtained, which is distinguished by its high dyestuff yield, very good build-up and excellent fastness properties.

The dyestuff used had been manufactured as described in Example 4, except that instead of the 60 parts of diethylene glycol monobutyl ether, 60 parts of ethylene glycol mono-(2-isopropyl-3-methyl)-phenyl ether were employed.

EXAMPLE 8

A woven fabric of polyethylene terephthalate fibres is impregnated at room temperature with a clear red solution which contains 10 parts of 1-amino-2-n-dodecylmercapto-4-hydroxy-anthraquinone and 7 parts of nonylphenyl-heptaglycol-ether in 983 parts of tetrachlorethylene. After squeezing out to a weight increase of 60%, the woven fabric is dried for one minute at 80° C. and the dyestuff is fixed by heating the woven fabric to 190–220° C. for one minute. A clear, bluish-tinged red dyeing is obtained which is distinguished by high dyestuff yield, very good build-up and good fastness properties, especially good fastness to thermofixing, washing, rubbing and light.

The dyestuff used had been manufactured as follows: 12 parts of 1-amino-2-bromo-4-hydroxy-anthraquinone were dissolved in 200 parts of pyridine. The solution was mixed with 4 parts of powdered potassium hydroxide and then with 25 parts of n-dodecylmercaptan, and were subsequently warmed to 40–50° C. The dyestuff formed was separated out of the reaction mixture by adding 200 parts of methanol and 5 parts of glacial acetic acid, filtered off and washed with methanol and water. Yield: 16.2 parts.

Clear red to bluish-tinged red dyeings of excellent fastness properties on woven fabrics of polyester, triacetate, polyamide, polyurethane and polyolefin fibres were also obtained if instead of the indicated dyestuff the same amount of one of the dyestuffs indicated in the table which follows, or mixtures of these with one another, were used:

| Example | Dyestuff |
|---|---|
| 9 | 1-amino-2-n-butoxy-4-hydroxy-anthraquinone. |
| 10 | 1-amino-2-(1-methyl-propoxy)-4-hydroxy-anthraquinone. |
| 11 | 1-amino-2-[2-(2-methyl)-propoxy]-4-hydroxy-anthraquinone. |
| 12 | 1-amino-2-(2-methyl-propoxy)-4-hydroxy-anthraquinone. |
| 13 | 1-amino-2-n-pentoxy-4-hydroxy-anthraquinone. |
| 14 | 1-amino-2-(3-methyl-butoxy)-4-hydroxy-anthraquinone. |
| 15 | 1-amino-2-n-hexoxy-4-hydroxy-anthraquinone. |
| 16 | 1-amino-2-(1,3-bis-methyl-butoxy)-4-hydroxy-anthraquinone. |
| 17 | 1-amino-2-(2,2-bis-methyl-butoxy)-4-hydroxy-anthraquinone. |
| 18 | 1-amino-2-(2-ethyl-butoxy)-4-hydroxy-anthraquinone. |
| 19 | 1-amino-2-n-heptoxy-4-hydroxy-anthraquinone. |
| 20 | 1-amino-2-n-octyloxy-4-hydroxy-anthraquinone. |
| 21 | 1-amino-2-(2-ethyl-hexoxy)-4-hydroxy-anthraquinone. |
| 22 | 1-amino-2-(2,2-bis-methyl-hexoxy)-4-hydroxy-anthraquinone. |
| 23 | 1-amino-2-(2,2-bis-methyl-octyloxy)-4-hydroxy-anthraquinone. |
| 24 | 1-amino-2-n-dodecanoxy-4-hydroxy-anthraquinone. |
| 25 | 1-amino-2-(2,2-bis-methyl-decanoxy)-4-hydroxy-anthraquinone. |
| 26 | 1-amino-2-n-tetradecanoxy-4-hydroxy-anthraquinone. |
| 27 | 1-amino-2-n-octadecanoxy 4-hydroxy-anthraquinone. |
| 28 | 1-amino-2-n-butylmercapto-4-hydroxy-anthraquinone. |
| 29 | 1-amino-2-n-pentylmercapto-4-hydroxy-anthraquinone. |
| 30 | 1-amino-2-n-hexylmercapto-4-hydroxy-anthraquinone. |
| 31 | 1-amino-3-butylmercapto-4-hydroxy-anthraquinone. |
| 32 | 1-amino-3-n-dodecylmercapto-4-hydroxy-anthraquinone. |
| 33 | 1-amino-2-(2-isopropoxy-ethoxy)-4-hydroxy-anthraquinone. |
| 34 | 1-amino-2-(2-n-butoxy-ethoxy)-4-hydroxy-anthraquinone. |
| 35 | 1-amino-2-[2-(2'-ethyl-hexoxy)-ethoxy]-4-hydroxy-anthraquinone. |
| 36 | 1-amino-2-[2-(2'-(2''-ethylhexoxy)-ethoxy)-ethoxy]-4-hydroxy-anthraquinone. |
| 37 | 1-amino-2-(3-methoxy-butoxy)-4-hydroxy-anthraquinone. |
| 38 | 1-amino-2-(1-methyl-2-phenoxy-ethoxy)-4-hydroxy-anthraquinone. |
| 39 | 1-amino-2-(1-methyl-2-[4'-benzylphenoxy]-ethoxy)-4-hydroxy-anthraquinone. |
| 40 | 1-amino-2-(1-ethyl-2-phenoxy-ethoxy)-4-hydroxy-anthraquinone. |
| 41 | 1-amino-2-(2-[4'-isooctyl-phenoxy]-ethoxy)-4-hydroxy-anthraquinone. |
| 42 | 1-amino-2-(2-[2'-cyclohexyl-phenoxy]-ethoxy)-4-hydroxy-anthraquinone. |
| 43 | 1-amino-2-(2-[2'-tert.-butyl-phenoxy]-ethoxy)-4-hydroxy-anthraquinone. |
| 44 | 1-amino-2-(2-[4'-(α,α-dimethylbenzyl)-phenoxy]-ethoxy)-4-hydroxy-anthraquinone. |
| 45 | 1-amino-2-(2-[2'-sec.-butylphenoxy]-ethoxy)-4-hydroxy-anthraquinone. |
| 46 | 1-amino-2-(2-[2'-isopropyl-5'-methyl-phenoxy]-ethoxy)-4-hydroxy-anthraquinone. |
| 47 | 1-amino-2-(2-[4'-butoxycarbonyl-phenoxy]-ethoxy)-4-hydroxy-anthraquinone. |
| 48 | 1-amino-2-(2-[4'-amyloxycarbonyl-phenoxy]-ethoxy)-4-hydroxy-anthraquinone. |
| 49 | 1-amino-2-(2-[2'-isopropyl-3'-methylphenoxy]-ethylmercapto)-4-hydroxy-anthraquinone. |
| 50 | 1-amino-3-(2,2-bis-methyl-octyloxy)-4-hydroxy-anthraquinone. |
| 51 | 1-amino-3-(2-n-butoxy-ethoxy)-4-hydroxy-anthraquinone. |
| 52 | 1-amino-3-(1-methyl-2-[4'-cyclohexylphenoxy]-ethoxy)-4-hydroxy-anthraquinone. |
| 53 | 1-amino-3-(2-[2'-isorpropyl-3'-methyl-phenoxy]-ethoxy)-4-hydroxy-anthraquinone. |
| 54 | 1-amino-2-(2-cyclohexoxyethoxy)-4-hydroxy-anthraquinone. |
| 55 | 1-amino-2-(2-benzyloxyethoxy)-4-hydroxy-anthraquinone. |
| 56 | 1-amino-2-(2-[4-methylbenzyloxy]-ethoxy)-4-hydroxy-anthraquinone. |
| 57 | 1-amino-2-(3-[4-cyclohexylphenoxy]-propoxy)-4-hydroxy-anthraquinone. |
| 58 | 1-amino-2-(2-[4-methyl-3-isopropyl-2-chlorophenoxy]-ethoxy)-4-hydroxy-anthraquinone. |
| 59 | 1-amino-2-(2-[1,3-bis-p-cyclohexylphenoxy]-isopropoxy)-4-hydroxy-anthraquinone. |
| 60 | 1-amino-2-(2-[1,3-bis-n-butoxy]-isopropoxy)-4-hydroxy-anthraquinone. |
| 61 | 1-amino-2-(2-[1,3-bis-cyclohexoxy]-isopropoxy)-4-hydroxy-anthraquinone. |
| 62 | 1-amino-2-(2-[1-p-cyclohexylphenoxy-3-phenoxy]-isopropoxy)-4-hydroxy-anthraquinone. |
| 63 | 1-amino-2-(2-[1-p-methylmercaptophenoxy-3-p-benzylphenoxy]-isopropoxy)-4-hydroxy-anthraquinone. |
| 64 | 1-amino-2-(2-[1-p-methylphenoxy-3-phenoxy]-isopropoxy)-4-hydroxy-anthraquinone. |
| 65 | 1-amino-2-(2-[1-p-methylphenoxy-3-o-chlorophenoxy]-isopropoxy)-4-hydroxy-anthraquinone. |
| 66 | 1-amino-2-n-octylmercapto-4-hydroxy-anthraquinone. |
| 67 | 1-amino-2-tert.octylmercapto-4-hydroxy-anthraquinone. |
| 68 | 1-amino-2-tert.decylmercapto-4-hydroxy-anthraquinone. |
| 69 | 1-amino-n-hexadecylmercapto-4-hydroxy-anthraquinone. |
| 70 | 1-amino-2-n-octadecylmercapto-4-hydroxy-anthraquinone. |

EXAMPLE 71

A woven fabric of cellulose triacetate fibres is impregnated at room temperature with a clear red solution which contains 10 parts of a dyestuff mixture of 5 parts of 1-amino - 3-octadecanoxy-4-hydroxy-anthraquinone and 5 parts of 1 - amino - 3-hexadecanoxy-4-hydroxy-anthraquinone which had been maunfactured in the manner indicated below, and 7 parts of nonylphenol-heptaglycolether in 983 parts of tetrachlorethylene. After squeezing out to a weight increase of 60%, the woven fabric is dried for one minute at 80° C. Thereafter the dyestuff is fixed by heating the woven fabric to 215° C. for one minute. A clear red dyeing is obtained, which is distinguished by high dyestuff yield, good build-up and good fastness properties, especially good fastness to thermofixing, washing, rubbing and light.

The dyestuff mixture used had been manufactured as follows: 20 parts of 1,2-dihydroxy-4-p-tosylamino-anthraquinone in 100 parts of anhydrous nitrobenzene were heated together with 6 parts of sodium carbonate, 10 parts of n-octadecanol-p-tosyl ester and 10 parts of n-hexadecanol-p-tosyl ester to 200° C. for 1½ hours. The dyestuff mixture was separated out by adding 200 parts of methanol and 8 parts of glacial acetic acid to the cooled reaction batch and was subsequently filtered off and washed with methanol and water. Yield: 26.8 parts of a 1:1 dyestuff mixture of 1-hydroxy-2-octadecanoxy- and 1 - hydroxy-2-hexadecanoxy-4-p-tosylamino-anthraquinone.

18 parts of this dyestuff mixture were dissolved in 100 parts of concentrated sulphuric acid and the solution was stirred for one hour at 15–20° C. After working up the solution with water, 13 parts of a 1:1 dyestuff mixture of 1-amino-3-octadecanoxy-and 1-amino-3-hexadecanoxy-4-hydroxy-anthraquinone were obtained.

We claim:
1. Process for the continuous dyeing of synthetic polyester fiber material comprising the steps of
  (A) impregnating the fiber material with a non-aqueous dyeing liquor said liquid consisting essentially of an organic solvent and an anthraquinone dyestuff; said organic solvent consisting of water-immiscible halogenated hydrocarbon having a boiling point of 40° C. to 150° C.; said anthraquinone dyestuff having the formula

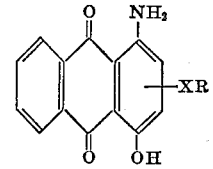

in which X is oxygen or sulfur; R is $C_4$–$C_{18}$-alkyl, alkoxyalkyl, cycloalkoxyalkyl, aralkoxyalkyl or aryloxyalkyl;
  (B) subjecting the fiber material to a heat treatment to fix said dyestuff on said synthetic polyester fiber material.
2. The process of claim 1 in which the anthraquinone dyestuff has the formula

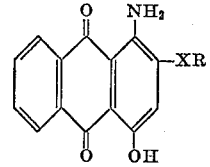

in which X is oxygen or sulfur; and R is $C_4$–$C_{18}$-alkyl.

3. The process of claim 1 in which the anthraquinone dyestuff has the formula

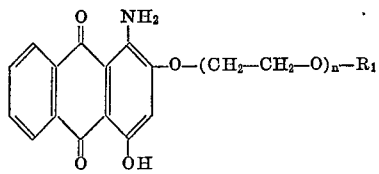

in which $n$ is 1 or 2; and $R_1$ is $C_2$–$C_{18}$-alkyl, cycloalkyl, aralkyl, phenyl or phenyl substituted with $C_1$–$C_9$-alkyl, cycloalkyl, aralkyl, $C_1$–$C_5$-alkoxy, $C_1$–$C_5$-alkylmercapto, $C_1$–$C_5$-alkoxycarbonyl or chlorine; with the proviso that the sum of the carbon atoms in $R_1$ is 2 to 18.

4. The process of claim 1 in which the anthraquinone dyestuff has the formula

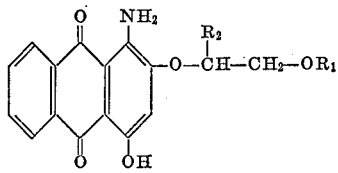

in which $R_2$ is methyl or ethyl; $R_1$ is $C_2$–$C_{18}$-alkyl, cycloalkyl, aralkyl, phenyl, or phenyl substituted with $C_1$–$C_9$-alkyl, cycloalkyl, aralkyl, $C_1$–$C_5$-alkoxy, $C_1$–$C_5$-alkylmercapto, $C_1$–$C_5$-alkoxycarbonyl or chlorine, with the proviso that the sum of the carbon atoms in $R_1$ is 2 to 18.

5. The process of claim 1 in which the anthraquinone dyestuff has the formula

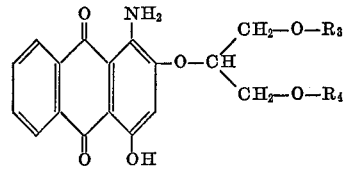

in which $R_3$ and $R_4$ independently of one another are $C_2$–$C_{18}$-alkyl, cycloalkyl, aralkyl, phenyl, or phenyl substituted with $C_1$–$C_9$-alkyl, cycloalkyl, aralkyl, $C_1$–$C_5$-alkoxy, $C_1$–$C_5$-alkylmercapto, $C_1$–$C_5$-alkoxycarbonyl or chlorine; with the proviso that the sum of the carbon atoms in $R_3$ and $R_4$ is 4 to 36.

6. The process of claim 1 in which the anthraquinone dyestuff is 1 - amino-2-[2-(2'-butoxyethoxy)-ethoxy]-4-hydroxy-anthraquinone.

7. The process of claim 1 in which the anthraquinone dyestuff is 1-amino-2-[-(2'-isopropyl-3'-methyl-phenoxy)-ethoxy]-4-hydroxy-anthraquinone.

8. The process of claim 1 in which the anthraquinone dyestuff is 1 - amino - 2-(2-n-butoxyethoxy)-4-hydroxy-anthraquinone.

9. The process of claim 1 in which the anthraquinone dyestuff is 1-amino-2-[2-(2'-sec.-butylphenoxy)ethoxy]-4-hydroxy-anthraquinone.

10. The process of claim 1 in which said anthraquinone dyestuff is soluble in said water-immiscible organic solvent.

11. The process of claim 10 in which the dyed material is subjected to a subsequent step of (C) rinsing with cold water-immiscible organic solvent in which said anthraquinone dyestuff is soluble.

12. The process of claim 1 in which said water-immiscible organic solvent is an aliphatic chlorohydrocarbon having a boiling point of between 40 and 150° C.

13. The process of claim 1 in which said water-immiscible organic solvent is selected from the group consisting of tetrachloroethylene, trichloroethylene, 1,1,1-trichloroethane, 1,1,1,-trichloropropane and mixtures thereof.

References Cited
UNITED STATES PATENTS

| | | | |
|---|---|---|---|
| 2,828,180 | 3/1958 | Sertorio | 8—62 |
| 3,264,325 | 8/1966 | Lewis | 260—380 |
| 3,510,243 | 5/1970 | Sueret et al. | 8—3 |

FOREIGN PATENTS

| | | | |
|---|---|---|---|
| 1,045,839 | 10/1966 | Great Britain. | |
| 1,002,876 | 9/1965 | Great Britain | 8—39 |
| 603,298 | 8/1960 | Canada | 260—380 |
| 1,217,380 | 12/1970 | Great Britain. | |

GEORGE F. LESMES, Primary Examiner

P. IVES, Assistant Examiner

U.S. Cl. X.R.

8—25; 260—380